United States Patent
Chang

(10) Patent No.: US 8,253,839 B2
(45) Date of Patent: Aug. 28, 2012

(54) LENS ASSEMBLY AND CAMERA MODULE HAVING SAME

(75) Inventor: Chia-Chun Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 225 days.

(21) Appl. No.: 12/761,366

(22) Filed: Apr. 15, 2010

(65) Prior Publication Data

US 2011/0075013 A1 Mar. 31, 2011

(30) Foreign Application Priority Data

Sep. 28, 2009 (CN) .......................... 2009 1 0307858

(51) Int. Cl.
*H04N 5/225* (2006.01)
*G02B 13/16* (2006.01)

(52) U.S. Cl. ....................................... 348/335; 348/373

(58) Field of Classification Search ................... 348/335
See application file for complete search history.

(56) References Cited

U.S. PATENT DOCUMENTS

| | | | |
|---|---|---|---|
| 7,133,076 B1* | 11/2006 | Campbell | 348/340 |
| 2003/0193605 A1* | 10/2003 | Yamaguchi | 348/335 |
| 2004/0094825 A1* | 5/2004 | Onishi et al. | 257/666 |
| 2005/0264670 A1* | 12/2005 | Yamaguchi et al. | 348/335 |
| 2006/0062559 A1* | 3/2006 | Naka et al. | 396/79 |
| 2006/0092310 A1* | 5/2006 | Sato et al. | 348/335 |
| 2007/0138725 A1* | 6/2007 | Yonezawa et al. | 269/309 |
| 2009/0302205 A9* | 12/2009 | Olsen et al. | 250/226 |

* cited by examiner

*Primary Examiner* — Sinh Tran
*Assistant Examiner* — Christopher K Peterson
(74) *Attorney, Agent, or Firm* — Altis Law Group, Inc.

(57) ABSTRACT

A lens assembly includes a first lens and a second lens. The first lens includes an optical axis, and a first engaging face facing toward the optical axis and a first engaging structure formed on the first engaging face. The second lens is used for engagement with and coaxially alignment with the first lens. The second lens includes a second engaging face facing away from the optical axis and a second engaging structure formed on the second engaging face for engagement with the first engaging structure of the first lens. The second lens is rotatable about the axis but non-movable along the optical axis relative to the first lens when the second lens is engaged with the first lens.

16 Claims, 3 Drawing Sheets

LENS ASSEMBLY AND CAMERA MODULE HAVING SAME

BACKGROUND

1. Technical Field

The disclosure relates to a lens assembly, and a camera module having the lens assembly.

2. Description of Related Art

Lenses in a camera module are used to converge light from objects to a photosensitive element, such as film, a Charge Coupled Device (CCD) or complementary metal oxide semiconductor (CMOS) and so on, to form images of the objects. Camera modules may employ more than one lens for better modulating light, however, it is difficult to keep the lenses coaxial to each other. Generally, lenses used in a camera each will have a flat periphery that is useful for connecting with other lenses or the holder, but useless for maintaining coaxiality.

Therefore it is desirable to provide a lens assembly which can overcome the above problems.

DETAILED DESCRIPTION

Figure 1:
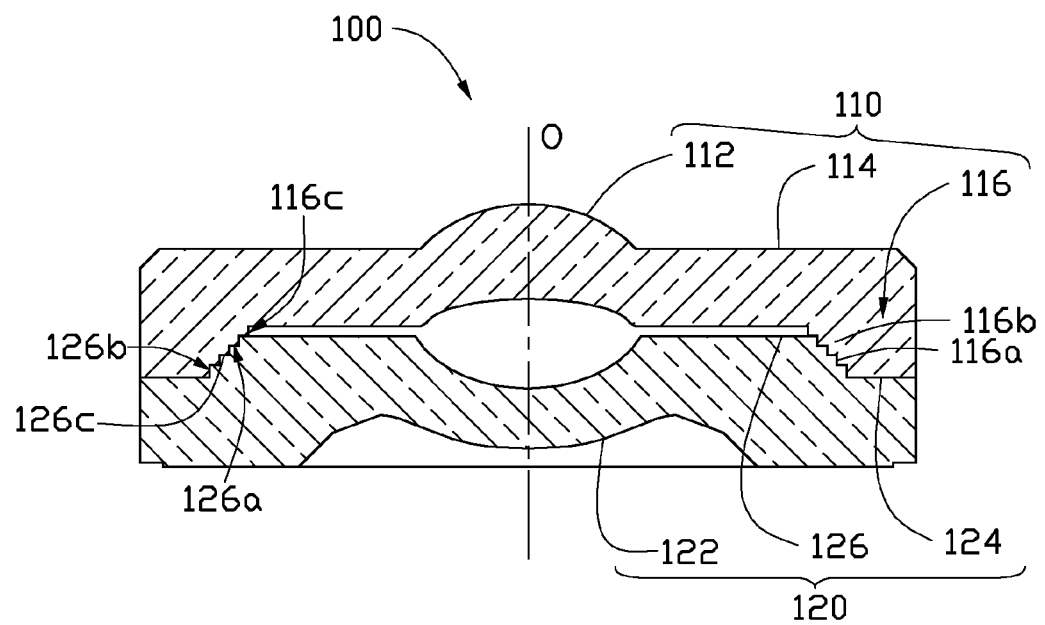
FIG. 1 is a cross-sectional schematic view of a lens assembly in accordance with one embodiment of the present disclosure.

Referring to FIG. 1, a lens assembly 100 includes a first lens 110 and a second lens 120, which are engaged with each other by a couple of engaging faces each having a engaging structure formed thereon for engaging to another to interconnect the lenses 110 and 120.

The first lens 110 includes a first optical portion 112 and a first non-optical portion 114 surrounding the first optical portion 112. The first non-optical portion 114 includes a first protrusion 116 surrounding the first optical portion 112. The first protrusion 116 has a first engaging face 116a facing toward the optical axis O and obliquely oriented relative to the optical axis. A first engaging structure 116b formed on the first engaging face 116a. In the present disclosure, the first engaging structure 116b includes a number of annular ridges 116c formed on the first engaging face. The annular ridges 116c are concentric with the optical axis. The diameter of the first protrusion 116 increases in a direction away from the first optical portion 112. The The second lens 120 includes a second optical portion 122 and a second non-optical portion 124 surrounding the second optical portion 122. The second non-optical portion 124 includes a second protrusion 126 adjacent to and surrounding the second optical portion 122. The second protrusion 126 includes a second engaging face 126a facing away from the optical axis O and obliquely oriented relative to the optical axis. A second engaging structure 126b formed on the second engaging face 126a. In the present disclosure, the second engaging structure 126b includes a number of annular grooves 126c formed on the second engaging face 126a for engagement with the annular ridges 116c of the first lens 110 to coaxially align with the first lens 110. The annular grooves 126c are concentric with the optical axis and each has an opening angle equal or smaller than 90 degrees. The annular ridges 116c, and the annular grooves 126a of the first and second engaging structures 116b and 126b can engage with each other thereby coaxially align the first lens. Alternatively, the first and second engaging structures 116b and 126b are stepped.

In assembly, the second protrusion 126 of the second 120 is inserted into the first protrusion 116 of the first lens 110 with the annular grooves 126c receiving the annular ridges 116c of the first protrusion 116. As the annular ridges 116c, and the grooves 126c are coaxial with the optical axes of the first and second lenses 110, 120, the center optical axes of the first and second lens 110, 120 are coaxial with each other when the annular ridges 116c and annular grooves 126c are directly engaged with each other. The engaged annular ridges 116c and the annular grooves 126c make the t second capable of being rotatable about the optical axis but non-movable along optical relative to the first lens 120.

Figure 2:
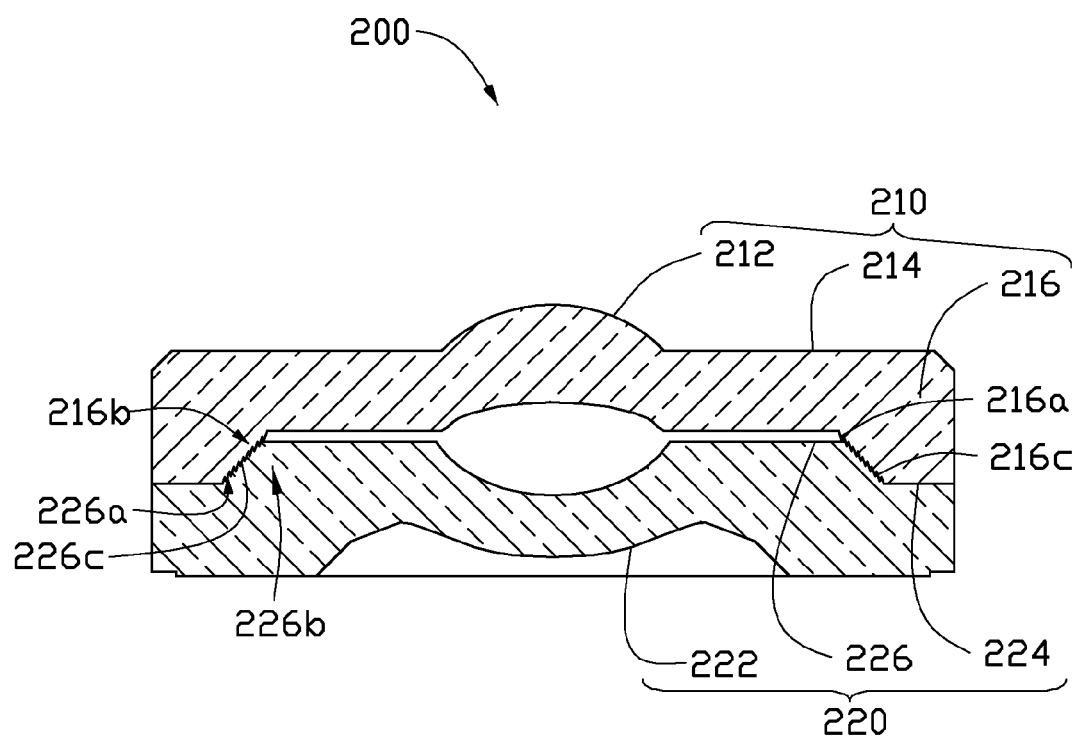
FIG. 2 is a cross-sectional schematic view of a lens assembly in accordance with another embodiment of the present disclosure.

Referring to FIG. 2, a lens assembly 200 is similar to the lens assembly 100, but with differently shaped annular ridges. In the lens assembly 200, the portions similar to the lens assembly 100 will not be described. The annular ridges 216c has an acute angle at the peak and the annular groove 226c is shaped according to the profile of the annular ridges 216c. In other words, In other words, the profile of each of the first and second engaging structures 216b and 126b is serrate shaped. In the present disclosure, the first annular ridges 216c, deviates from planes perpendicular to the center optical axes of the first lenses 210. The inclined annular ridges 216c can be received in the annular grooves 226c.

Figure 3:
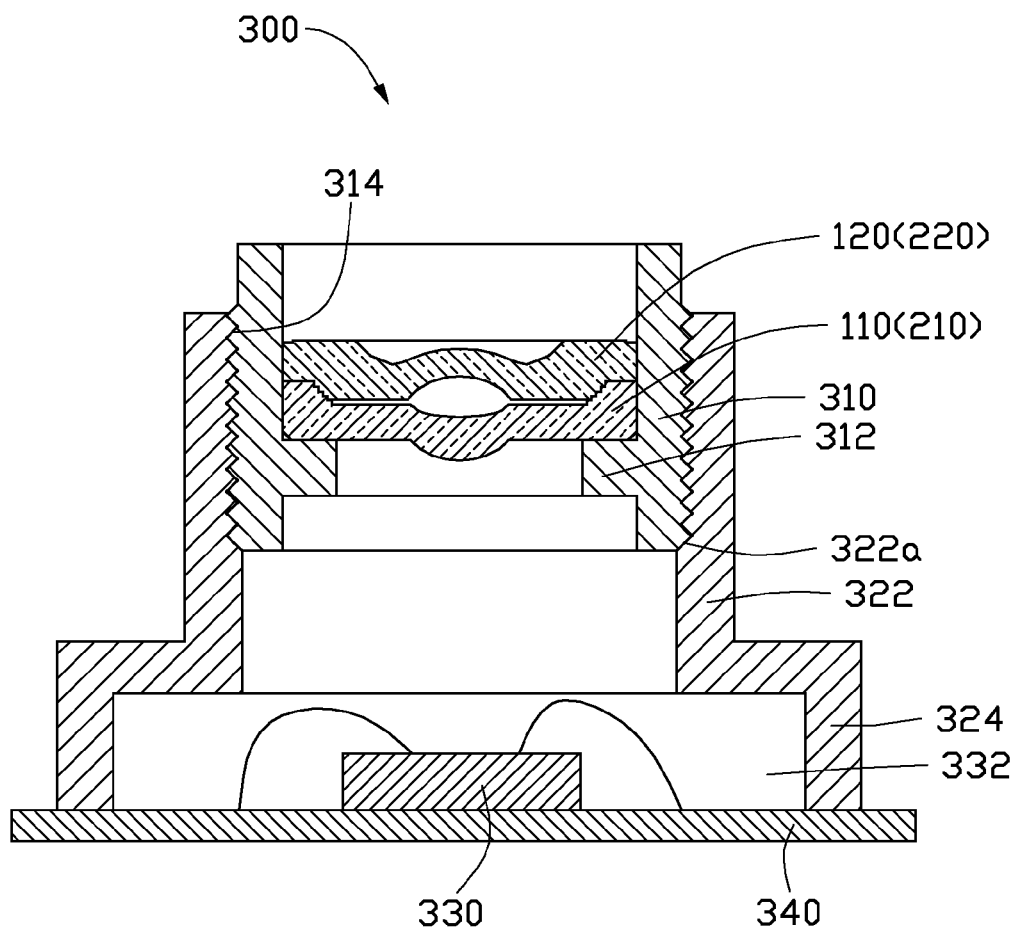
FIG. 3 is a cross-sectional schematic view of a camera module in accordance with one embodiment of the present disclosure.

Referring to FIG. 3, a camera module 300 includes an externally threaded barrel 310, a holder 320, a sensor 330, and a substrate 340.

The barrel 310 is configured for receiving the lens assembly 100 or 200. The lens assembly 100 or 200 is adhered on the inner side of the barrel 310 in which an annular flange 312 is formed for holding the lens assembly 100 or 200. The barrel 310 can be screwed into the holder 320. Alternatively, the barrel 310 can be fixed in the holder 320 by another way such as adhering the barrel 310 to the holder 320 or configuring both to snap fit.

The holder 320 includes a first compartment 322, and a second compartment 324 communicating with the first compartment 322. The first compartment 322 is used for receiving the barrel 310. An inner thread 322a is formed on the wall of the first compartment 322, to receive the barrel 310 thereby fixing the barrel 310 in the holder 320. The second compartment 324 is defined below the first compartment 322 for receiving the sensor 330. The holder 320 is mounted on the substrate 340 thereby sealing the sensor 330 together with the substrate 340.

The sensor 330 is a photosensitive electronic member, such as a CCD, or a CMOS. The sensor 330 is mounted on the substrate 340 and electrically connected to the substrate 340.

The substrate 340 is a base for holding the holder 320 and the sensor 330, and is made of ceramic material or plastic material as required.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens assembly comprising:

a first lens comprising an optical axis, a first optical portion and a first non-optical portion surrounding the first optical portion, wherein the first non-optical portion comprises a first protrusion having a first engaging face facing toward the optical axis and a first engaging structure formed on the first engaging face, the first engaging structure comprises a plurality of annular ridges formed on the first engaging face; and a second lens for engagement with and coaxially alignment with the first lens, the second lens comprising a second optical portion and a second non-optical portion surrounding the second optical portion; the second non-optical portion comprising a second protrusion, the second protrusion having a second engaging face facing away from the optical axis and a second engaging structure formed on the second engaging face for engagement with the first engaging structure of the first lens, wherein the second engaging structure comprises a plurality of annular grooves formed on the second engaging face, the second lens is rotatable about the axis but non-movable along the optical axis relative to the first lens when the second lens is engaged with the first lens.

2. The lens assembly of claim 1, wherein the first and second engaging structures are stepped.

3. The lens assembly of claim 1, wherein the profile of each of engaging structures is serrate shaped.

4. The lens assembly of claim 1, wherein the annular ridges are concentric with the optical axis, and the annular grooves are concentric with the optical axis.

5. The lens assembly of claim 4, wherein the diameter of the first protrusions increases in a direction away from the first optical portion.

6. The lens assembly of claim 5, wherein the first and second engaging faces are obliquely oriented relative to the optical axis.

7. The lens assembly of claim 5, wherein each of the grooves are V-shaped grooves.

8. The lens assembly of claim 7, wherein an opening angle of the V-shaped grooves is not greater than 90 degrees.

9. A camera module comprising:

a circuit board;

a sensor mounted on the circuit board and electrically connected to the circuit board;

a holder mounted on the circuit board and receiving the sensor;

a barrel fixedly received in the holder; and a lens assembly comprising:

a first lens comprising an optical axis, a first optical portion and a first non-optical portion surrounding the first optical portion, wherein the first non-optical portion comprises a first protrusion having a first engaging face facing toward the optical axis and a first engaging structure formed on the first engaging face, the first engaging structure comprises a plurality of annular ridges formed on the first engaging face; and a second lens for engagement with and coaxially alignment with the first lens, the second lens comprising a second optical portion and a second non-optical portion surrounding the second optical portion the second non-optical portion comprising a second protrusion, the second protrusion having a second engaging face facing away from the optical axis and a second engaging structure formed on the second engaging face for engagement with the first engaging structure of the first lens, wherein the second engaging structure comprises a plurality of annular grooves formed on the second engaging face, the second lens is rotatable about the axis but non-movable along the optical axis relative to the first lens when the second lens is engaged with the first lens engaging structure.

10. The camera module of claim 9, wherein the first and second engaging structures are stepped.

11. The camera module of claim 9, wherein the profile of each of engaging structures is serrate shaped.

12. The camera module of claim 9, wherein the annular ridges are concentric with the optical axis, and the annular grooves are concentric with the optical axis.

13. The camera module of claim 12, wherein the diameter of the protrusions increases in a direction away from the first optical portion.

14. The camera module of claim 13, wherein the first and second engaging faces are obliquely oriented relative to the optical axis.

15. The camera module of claim 13, wherein each of the grooves are V-shaped grooves.

16. The camera module of claim 15, wherein an opening angle of the V-shaped grooves is not greater than 90 degrees.

* * * * *